United States Patent [19]

Lindenmeier et al.

[11] Patent Number: 4,777,659

[45] Date of Patent: Oct. 11, 1988

[54] DETECTOR FOR INDICATING RECEPTION DISTURBANCES DURING ULTRASHORT WAVE BROADCAST RECEPTION

[75] Inventors: Heinz Lindenmeier, Planegg; Ernst Manner; Gerhard Flachenecker, both of Ottobrunn, all of Fed. Rep. of Germany

[73] Assignees: U.S. Philips Corporation; Hans Kolbe & Co., both of New York, N.Y.

[21] Appl. No.: 9,115

[22] Filed: Jan. 28, 1987

Related U.S. Application Data

[63] Continuation of Ser. No. 693,801, Jan. 23, 1985, abandoned.

[51] Int. Cl.⁴ .......... H04B 1/10

[52] U.S. Cl. .......... 455/296; 455/205; 455/226; 455/297; 455/312

[58] Field of Search .......... 455/52, 65, 135, 205, 455/226, 296, 297, 303, 311, 312; 381/10, 11, 13; 324/57 DE, 57 N

[56] References Cited

U.S. PATENT DOCUMENTS

| | | | |
|---|---|---|---|
| 3,869,673 | 3/1975 | Close | 455/303 |
| 4,245,352 | 1/1981 | Karpowycz et al. | 455/226 |
| 4,254,505 | 3/1981 | Bossert | 455/303 |
| 4,498,195 | 2/1985 | Ooi et al. | 455/303 |

FOREIGN PATENT DOCUMENTS

| | | | |
|---|---|---|---|
| 3107970 | 2/1982 | Fed. Rep. of Germany . | |
| 3122057 | 4/1982 | Fed. Rep. of Germany . | |
| 0162144 | 9/1983 | Japan | 455/303 |

*Primary Examiner*—Michael A. Masinick
*Attorney, Agent, or Firm*—David R. Treacy; Bernard Franzblau

[57] ABSTRACT

A detector for indicating reception disturbances during frequency modulated ultrashort wave broadcast reception, particularly in power vehicles, has a detector for indicating frequency disturbance deviations in high frequency or intermediate frequency carriers and an amplitude modulation detector for indicating disturbance amplitude modulation in the high frequency or intermediate frequency carrier, and an evaluating circuit with two inputs arranged so that the output signals of the detectors are supplied to the respective inputs of the evaluating circuit and an output signal of the evaluating circuit depends both on the disturbance amplitude modulation and the frequency disturbance deviation.

51 Claims, 7 Drawing Sheets

FREQUENCY DEVIATION DETECTOR 1
31
CHARACTERISTIC DETECTOR
2
LOGIC CIRCUIT
21
12
13
4
24
35
ADJUSTING CIRCUIT
EVALUATING CIRCUIT
10
33
AMPLITUDE MODULATION DISTURBANCE DETECTOR

2
LEVEL DISCRIMINATOR
31
3
23
LOGIC CIRCUIT
35
4
24
33
11
41
LEVEL DISCRIMINATOR

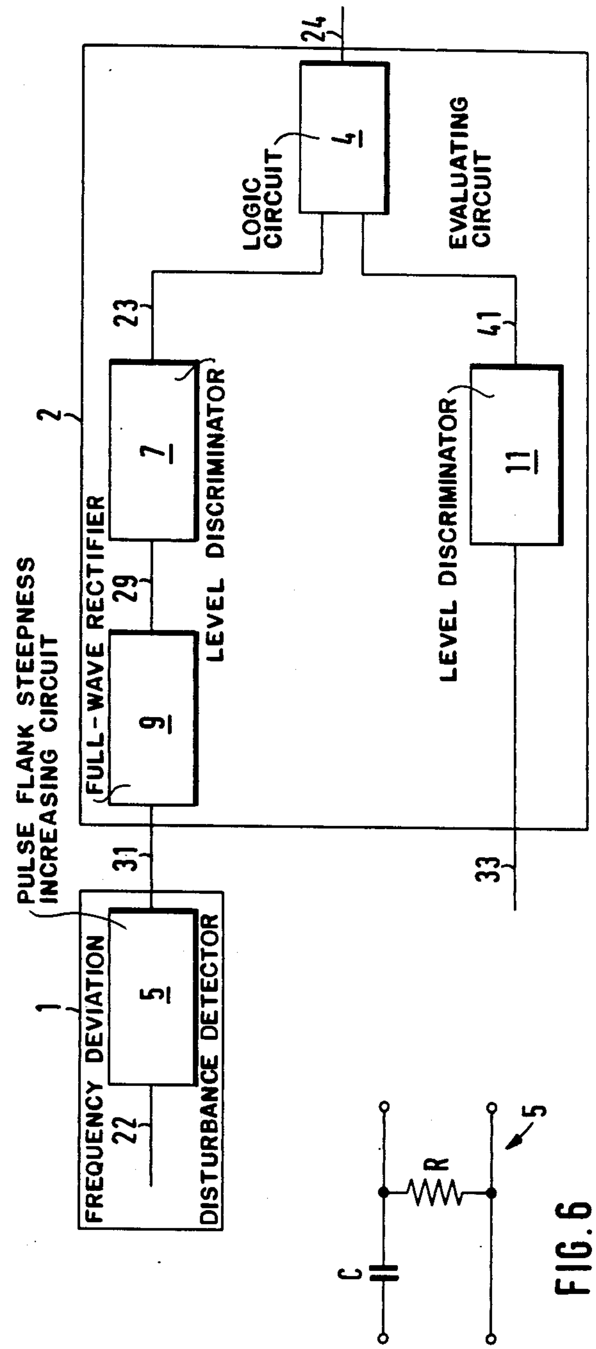
FIG. 8
FIG. 6
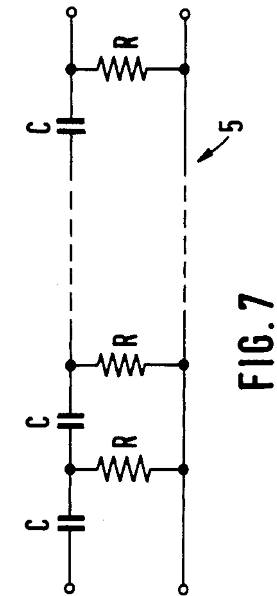
FIG. 7

DETECTOR FOR INDICATING RECEPTION DISTURBANCES DURING ULTRASHORT WAVE BROADCAST RECEPTION

This is a continuation of application Ser. No. 693,801 filed Jan. 23, 1985 now abandoned.

BACKGROUND OF THE INVENTION

The present invention relates to a detector for indicating reception disturbances during ultrashort wave frequency modulated broadcast reception. Such detectors are used, for example, for the improvement of broadcast reception in power vehicles. The object of the detector is to recognize and indicate a reception disturbance. For this purpose a shift operation is introduced which is generally carried out electronically. For example, the Offenlegungschrift DE-A1 3,107,970 describes an FM receiver in which the multipath noise is avoided with the aid of a detector and a shifting device. In the Offenlegungschrift DE-A1 No. 3,122,057 a tuner control with a detector for detecting the signal level is provided in a broadcast receiver. Moreover, the U.S. Pat. No. 3,825,697 discloses a shifting device which, after recognition of the disturbance because of the multipath reception, shifts from stereo operation to mono operation. In all of the above described cases a detector for recognition of the disturbance is required.

A detector for recognition of disturbances is also known from the U.S. Pat. No. 4,216,353. This detector is especially designed for recognition of disturbing multipath propagation of electromagnetic waves with greatly different transit times. As a result of this effect, an increased noise and a distortion of the low frequency communication takes place at the output of the frequency demodulator. In the case of stereo transmission this fact also results in an increased cross-talk between both stereo channels. The detector described in this patent is based on the evaluation of the amplitude-time behavior of the frequency demodulated signal available in the receiver. This detector has, in case of its use in an automobile receiver, the following disadvantages. It is known that superposition of partial waves at the reception point in the event of transit time differences between 1 μs and 100 μs leads to significant distortions of the low frequency communication at the output of the FM of an FM receiver. This distortion passes, together with an amplitude modulation of the resulting high frequency carrier that depends, on the low frequency communication content, to the reception point. The detector disclosed in the U.S. Pat. No. 4,216,353 recognizes these amplitude modulations and indicates them as disturbances. However, the wave field is in most instances made up of partial waves whose transit time differences lie below 1 μs. This superposition of the partial waves does not lead to disturbances at the reception point, but causes a strong dependence of the resulting field amplitude on the reception location. The input level of the automobile receiver experiences, as a result of the movement of the vehicle in this wave field, a time-dependent amplitude change which appears as an amplitude modulation. A disadvantage of the above described detector is that it must distinguish between an amplitude modulation type which does not lead to disturbances and another amplitude modulation type which results from multipath propagation with large transit time differences and, thereefore, causes disturbances. This situation is especially difficult because both modulation types take place statistically and chronologically in a simultaneous manner. This results in an unreliable recognition of the actual disturbance and a relatively long detection time. This long detection time leads to a situation where the tuning in the reception system by switching can be carried out only so late that the broadcast listener has already sensed the disturbance.

SUMMARY OF THE INVENTION

Accordingly, it is an object of the present invention to provide a detector for indicating frequency deviation peaks, which avoids the disadvantages of the prior art.

More particularly, it is an object of the present invention to provide a detector for indicating frequency deviation peaks in which the occurrence of reception disturbances taking place during ultrashort wave stereo or mono reception and especially caused by multipath reception with strong transit time differences of the superposed waves can be recognized and indicated fast and accurately.

In keeping with these objects and with others which will become apparent hereinafter, one feature of the present invention resides, briefly stated, in a detector for the indication of reception disturbances during frequency modulated ultrashort wave broadcast reception, especially in power vehicles, which has a detector for indicating frequency disturbance deviation in the high frequency or intermediate frequency carrier and an amplitude modulation detector for indicating disturbance amplitude modulation in the high frequency or intermediate frequency carrier, and an evaluating circuit with two inputs supplied with the output signals from the detectors. The evaluating circuit develops an output signal that depends on the disturbance amplitude modulation and the frequency disturbance deviation.

In the present specification the following abbreviations are used: FM is frequency modulation, AM is amplitude modulation, HF is high frequency, IF is intermediate frequency.

The novel features which are considered as characteristic of the invention are set forth in particular, in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 6 and 7 are circuit diagrams of the embodiments of a circuit for increasing the steepness of pulse flanks;

FIG. 8 is a view showing a partial block diagram of the detector in accordance with the present invention with a further embodiment of the evaluating circuit;

DESCRIPTION OF THE PREFERRED EMBODIMENTS

An important basic feature of the present invention resides in the connection of the output signals of a detector for indicating frequency disturbance deviation and of an AM detector for indicating disturbance amplitude modulation. All known detectors for indicating reception disturbances are limited to the detection of the disturbance-connected amplitude modulation of the frequency modulated high frequency carrier. As a result the above described false indication of reception disturbances takes place. This leads, in those systems that use switching between different antennas, to additional reception disturbances and to long switching times.

Figure 10:
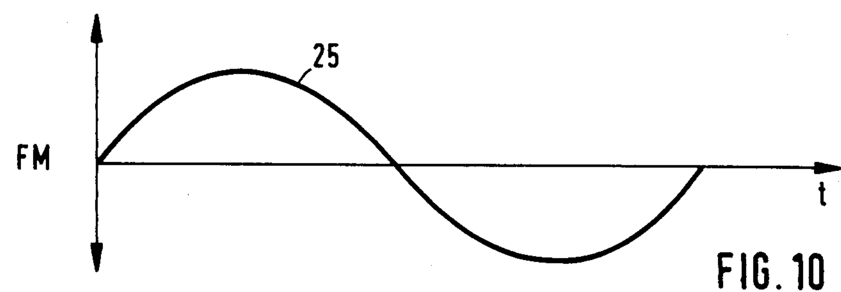
FIG. 10 is a view showing a time diagram of the effective frequency deviation for a sinusoidal low frequency signal.
Figure 11:
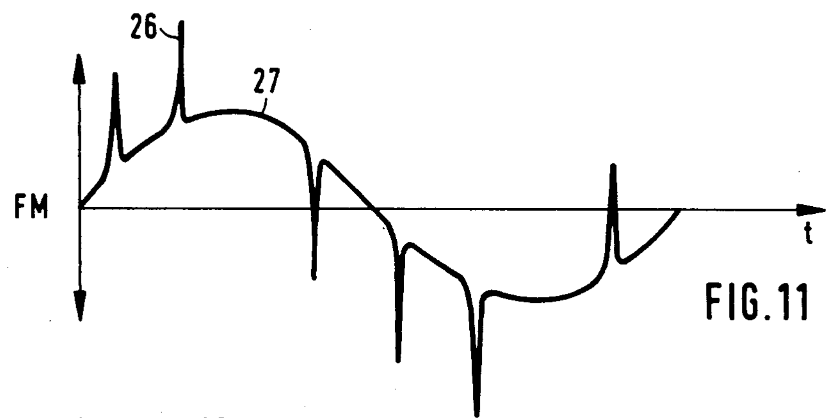
FIG. 11 is a view showing a time diagram of the resulting frequency deviation in the event of superposing waves with large transit time differences with sinusoidal-shaped effective signals.
Figure 12:
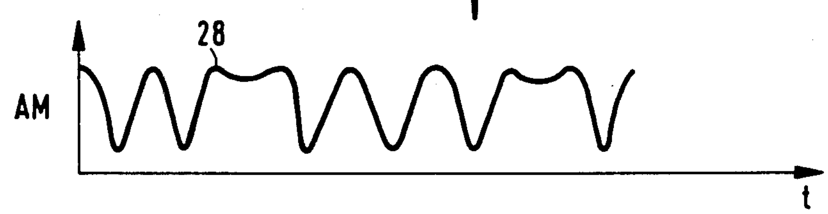
FIG. 12 is a view showing a time diagram of the resulting reception carrier amplitude in the event of multipath propagation with large transit time differences or in the event of reception in a moving automobile with multipath propagation with small transit time differences or with mixed effects.

The limitations in the recognition of reception disturbances from the time waveform of the carrier amplitude in the methods prior to the present invention can be understood from the following consideration of FIGS. 10–12 which show the signal time waveforms. If the signal 25 to be transmitted is sine-shaped, then with undisturbed transmission the time waveform 25 of the effective frequency deviation is also sine-shaped as shown in FIG. 10. When the antenna moves into a reception wave field which consists of a plurality of superimposed waves coming from different directions because of multipath propagation with small transit time differences, then a time variation of the carrier amplitude occurs at the receiver input as shown for example by a curve 28 in FIG. 12. In this case the HF signal resulting from the superposition of the waves in accordance with the Rayleigh field will not lead to a distortion in the demodulated signal when the signal does not fall during the amplitude drop below the noise level of the receiving device. The amplitude modulation shown in FIG. 12 is rendered ineffective by the amplitude limiting prior to the frequency demodulation. When the transit time difference of the waves superposed in the wave field exceeds a predetermined value, then a disturbance frequency deviation takes place on the useful frequency deviation and on the amplitude ratios of the superposed waves, which leads to frequency disturbance deviation peaks 26 shown by a curve 27 in FIG. 11.

From a comparison of FIGS. 11 and 12, it can be recognized that, at the times at which frequency disturbance deviation peaks take place in the distorted signal, an amplitude drop takes place in the underlying curve 28. The present invention makes use of this correlation for determining the reception disturbances in an especially fast and reliable manner. The waveform of the amplitude modulation, it alone does not provide a reliable indication of the occurrence of the reception disturbances. This is true especially in a moving vehicle wherein the resulting amplitude modulation depends on the movement within a wave field with partial waves with smaller transit time differences and also on the system-dependent disturbance resulting from the superposition of several waves with greater transit time differences. With the aid of the inventive simultaneous evaluation of frequency disturbance deviation peaks and of the amplitude modulation, the indication supplied by the reception disturbance detector is sufficiently fast and reliable to cause the switching operation to occur sufficiently early in the event of the occurrence of a disturbance.

In the case of reception disturbances by multipath reception with not too small transit time differences, both the amplitude of the high frequency carrier and the instantaneous frequency of the resulting received high frequency oscillation are falsified at the instant of occurrence of the disturbance. A disturbance can thus be reliably recognized from the simultaneous occurrence of the amplitude and frequency disturbances. A longer observation of the disturbance is not necessary for its accurate recognition. By simultaneous monitoring of the disturbance-connected amplitude and frequency error of the resulting high frquency oscillation at the reception point, a suitable switching operation for eliminating this reception error can be performed in the reception system immediately after the occurrence of both errors. The recognition time of reception disturbances realized with the inventive detector for indicating reception disturbances can be reduced to the region of μs. Moreover, switching operations can be performed which in the event of suitable execution guarantee avoidance of audible reception disturbances.

Figure 1:
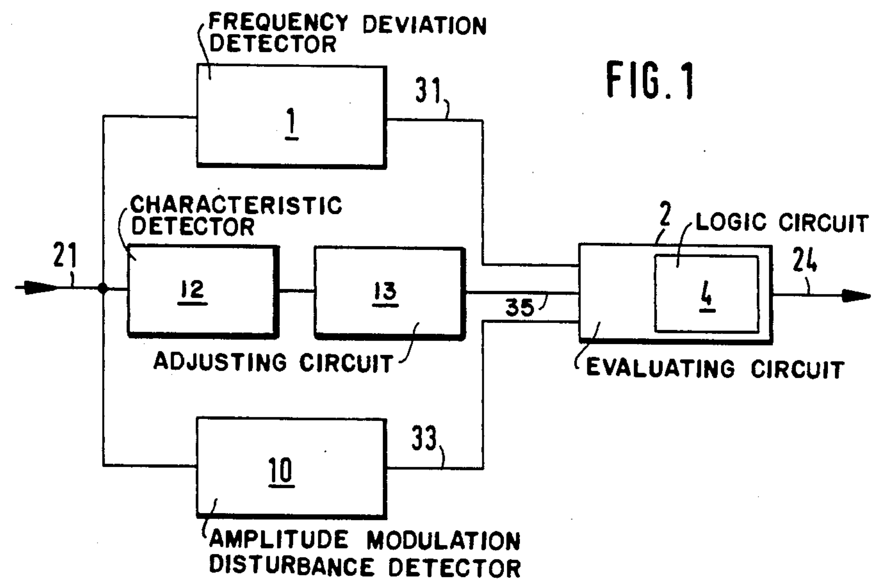
FIG. 1 is a view showing a block diagram of the basic embodiment of the detector in accordance with the present invention.

FIG. 1 shows the detector for indicating reception disturbances. It includes a detector 1 for indicating a frequency disturbance deviation, an AM detector 10 for indicating disturbance amplitude modulation and an evaluating circuit 2 having two inputs. Both detectors 1 and 10 are supplied with a distorted signal from a high or intermediate frequency carrier input line 21 at a circuit point in the FM receiver prior to its FM demodulator. Both output signals 31 and 33 of these detectors are supplied to the respective inputs of the evaluating circuit 2. The evaluating circuit 2 is designed so that its output signal 24 depends both on the disturbance amplitude modulation of the high frequency carrier on line 21 and on its frequency disturbance deviation.

In accordance with a special embodiment of the invention, the evaluating circuit 2 is designed so that the output signal 24 has a binary character and is formed so that the occurrence of the disturbance is indicated only when both the frequency disturbance deviation and the disturbance amplitude modulation of the received high frequency or intermediate frequency signals on line 21 exceed a predetermined threshold value. The binary decision for indicating the presence of a reception disturbance is made by the logic circuit 4. The input of the evaluating circuit 2 receives signals that indicate whether or not the disturbance amplitude modulation or the frequency disturbance deviation exceed a respectively adjusted threshold value. The correlation of these distortion information signals takes place in the logic circuit 4. A respective adjustment of the threshold value is advantageously measured at the audibility threshold of the received disturbances.

In accordance with an especially advantageous embodiment of the invention, the AM detector 10 for indicating the disturbance amplitude modulation is formed as an envelope curve demodulator. It is then advantageous to select the frequency bandwidth of the AM detector so that it is not smaller than the ultrashort wave channel bandwidth.

Figure 2:
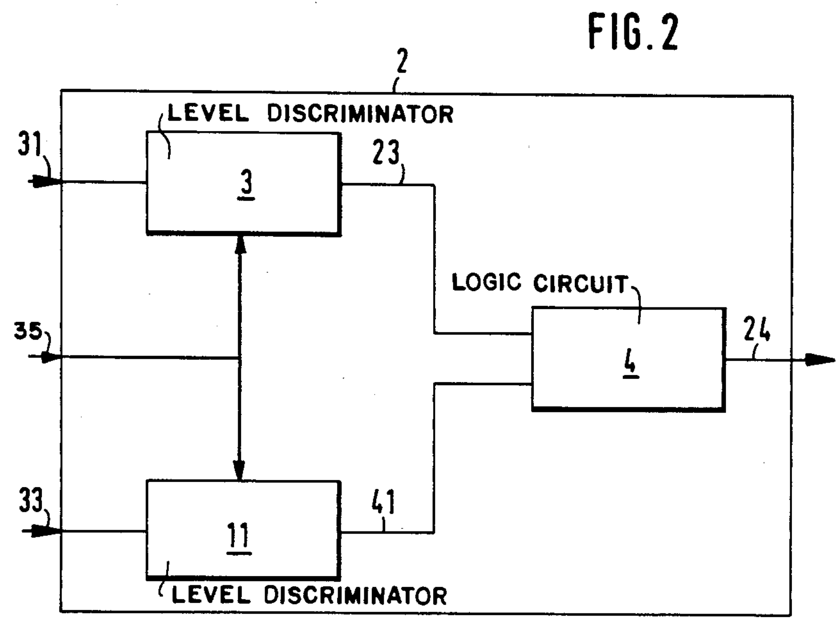
FIG. 2 is a view showing a block diagram of an embodiment of an evaluating circuit of the detector in accordance with the present invention.

FIG. 2 shows an advantageous embodiment of the evaluating circuit 2. It includes a unipolarly or bipolarly operating level discriminator 3 which receives an output signal 31 of the detector 1 for indicating the frequency disturbance deviation. A unipolar level discriminator 11 is provided in the signal branch for determining the disturbance amplitude modulation. An output signal 33 of the AM detector 10 is supplied to the level discriminator 11. Output signals 23 and 41 of the level discriminators 3 and 11, respectively, are evaluated by the logic circuit 4 so that the output signal 24 of the evaluating circuit 2 indicates in binary form the occurrence of a reception disturbance. The output signal 24 shows a disturbance only when both thresholds of the level discriminators 3 and 11 are exceeded.

FIGS. 1 and 2 also show additional circuitry which is operative for adjusting the threshold levels of the level discriminators 3 and 11. As illustrated, this additional circuitry incorporates a signal characteristic detector having an input receiving the incoming signal from the line 21, and an adjusting circuit 13 connected to the output of the characteristic detector 12 and having an output 35 which is connected to respective adjusting inputs of the level discriminators 3 and 11. The construction of such circuit components are well known, so that it is sufficient to mention that the characteristic detector 12 processes the incoming signal in a manner such as to provide at its output a signal representative of a characteristic property of the signal, such as time-averaged frequency modulation, time-averaged carrier amplitude, signal to noise ratio, or peak value of the frequency modulation, and that the adjusting circuit 13 utilizes this output signal for adjusting the respective threshold levels. Of course, depending on the type of signal characteristic chosen as the basis for the threshold level adjustment, the input of the detector 12 may be connected to different points of the remaining circuitry. This additional circuitry may also be used in the circuit constructions which will be discussed below, both commonly for the two discriminators as shown, or individually and independently for each or only one of the discriminators.

Reception disturbances take place in the output voltages 31 and 33 of both detectors 1 and 10 in the form of impulses. For better separation of these disturbances from the effective content of the received signal, these impulses in accordance with an advantageous embodiment of the invention are processed with the aid of a circuit increasing the steepness of the pulse flanks from the remaining signal. This leads to a further improvement of the accuracy during the determination of a reception disturbance. In contrast to the above-mentioned prior art in accordance with which reception disturbances were determined by amplitude demodulation with subsequent low-pass filters, in the present invention a filter with a high-pass characteristic is provided which does not exhibit a delayed action. Thus, the recognition time of the disturbance is not long.

Figure 3:
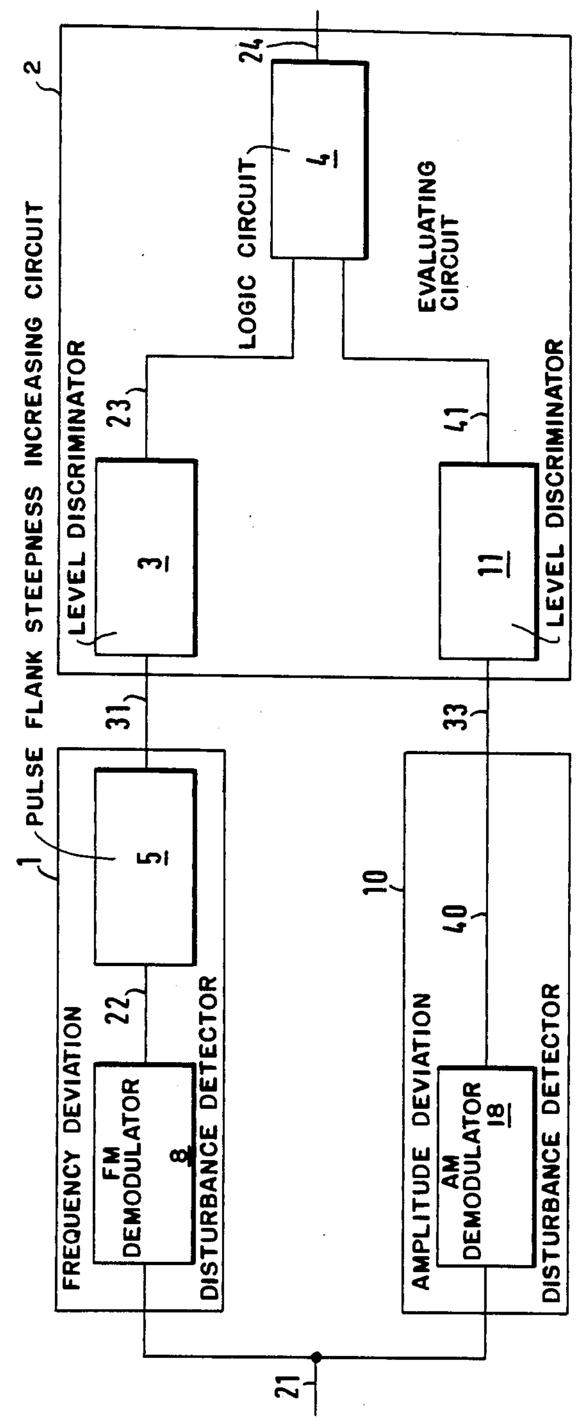
FIGS. 3 and 4 are views showing a block diagram or a partial block diagram of a second different embodiment of the detector in accordance with the present invention with special embodiments of FM and AM detectors and the evaluating circuit of FIG. 2.

FIG. 3 shows a circuit 5 for increasing the steepness of the pulse flanks for the FM detector 1. The circuit 5 is located after an FM demodulator 8. The disturbance-dependent pulse peaks in the output signal 31 are greater than the respective peaks in the signal 22 which is the output signal of the FM demodulator 8 and can be separated easier by the level discriminator 3 from the remaining effective (useful) signal. In a similar way, a circuit for increasing the steepness of the pulse flanks can be provided in the branch for recognition of the amplitude disturbance deviation and located after an AM demodulator 18. In this way, the disturbance impulses in the output signal 33 relative to the amplitude waveform which is produced by movement of the power vehicle is standing waves in the reception field are increased stronger than is a signal 40 which is the output signal of the AM demodulator 18. This is shown in FIG. 4.

Figure 4:
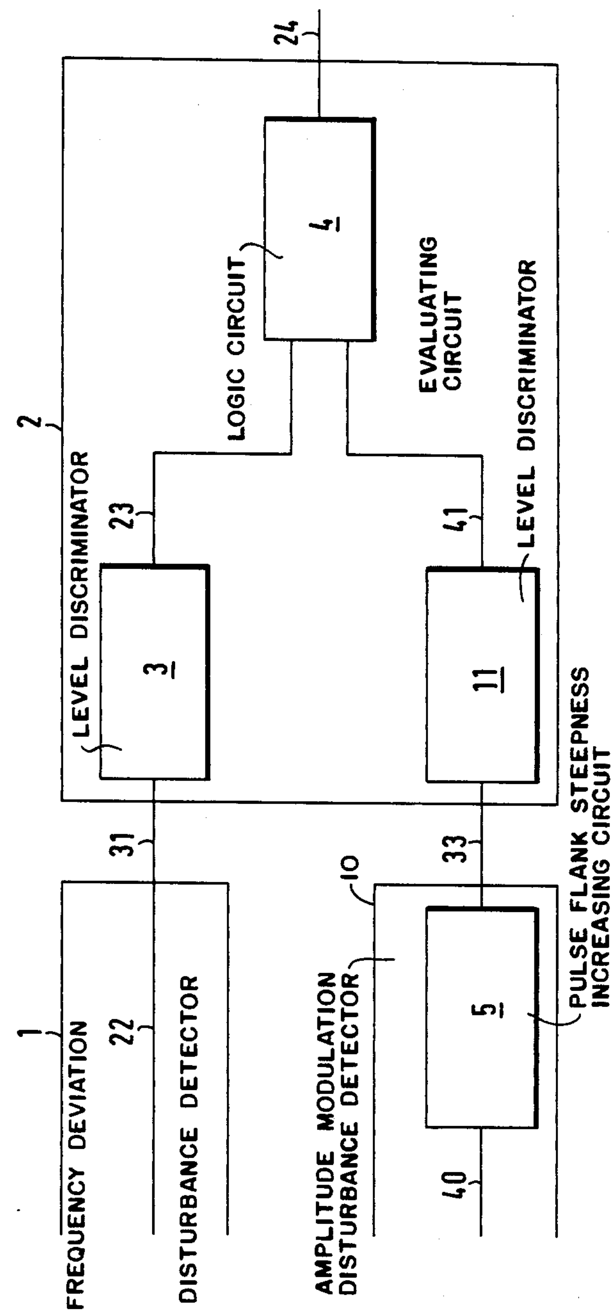
Figure 5:
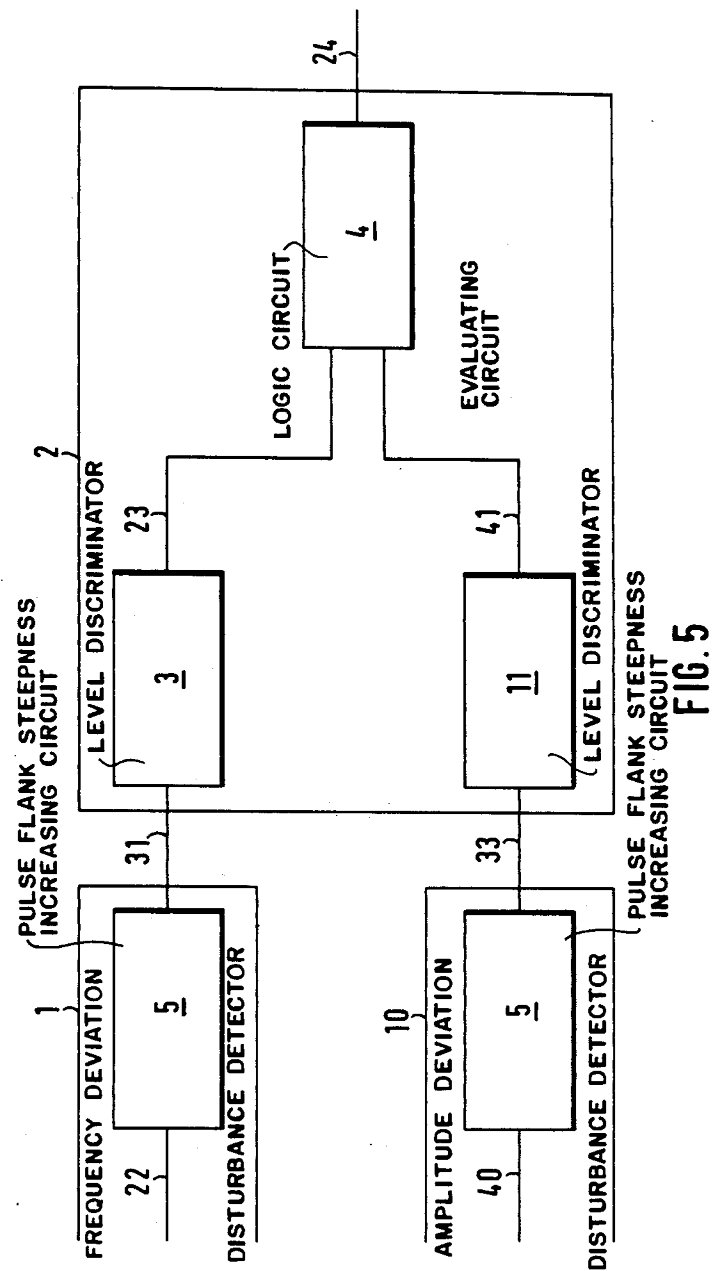
FIG. 5 is a view showing a block diagram of an embodiment of the detector combining the features of FIGS. 3 and 4.

FIG. 5 shows a construction which is a combination of the construction including the features of FIG. 4 and FIG. 3.

The circuit 5 for increasing the steepness of the pulse flanks can be formed in an especially advantageous embodiment by an RC high-pass filter member. In a known manner, the time constant of this RC circuit can be adjusted by selection of the series capacitance and the parallel resistance. This time constant is advantageously adjusted so that with the conventionally occurring reception disturbances, the best possible recognition of the disturbance impulse is provided. Such a differentiating member shown in FIG. 6 can be formed in accordance with a further embodiment of the invention as an RC chain circuit as shown in FIG. 7. The steepness of the pulse flanks increases with the number of RC chain members.

FIG. 8 shows the use of unipolar level discriminators 7 and 11 both in the branch for determination of the frequency disturbance deviation peaks and in the branch for determination of the disturbance amplitude modulation. In order to process despite a bipolar pulse sequence in output signal 31 of the FM detector 1 despite the use of a unipolar level discriminator, in accordance with an advantageous embodiment of the invention, a full-wave rectifier 9 producing an output signal 29 is arranged before the unipolarly operating level discriminator 7. Without this full-wave rectifier only the disturbance impulses of one polarity in the signal 31 would be evaluated. By the additional evaluation of the disturbance impulses of the other polarity, the reliability of the recognition of the disturbance in a short time is further increased.

FIG. 6 shows the circuit 5 for increasing the steepness of the pulse flanks by means of a frequency-dependent network with a high-pass characteristic. In accordance with a further embodiment of the invention, such a circuit can be designed to be frequency independent. In this case a circuit is selected which, in a known manner, as to the ratio between its output and input signals is composed of an exponential function with even-numbered exponents or of a sum of such exponential functions with identical signs, wherein the smallest occurring exponent is greater than 1. In such a case the full-wave rectifier 9 can be dispensed with. In an especially advantageous manner, this circuit for increasing the steepness of the pulse flanks can be composed of semiconductor diodes. In this case a circuit is preferred in which the relation between the output and input signals is a hyperbolic-cosine function.

The logic circuit 4 is designed in an especially simple embodiment as an AND-gate.

Figure 9:
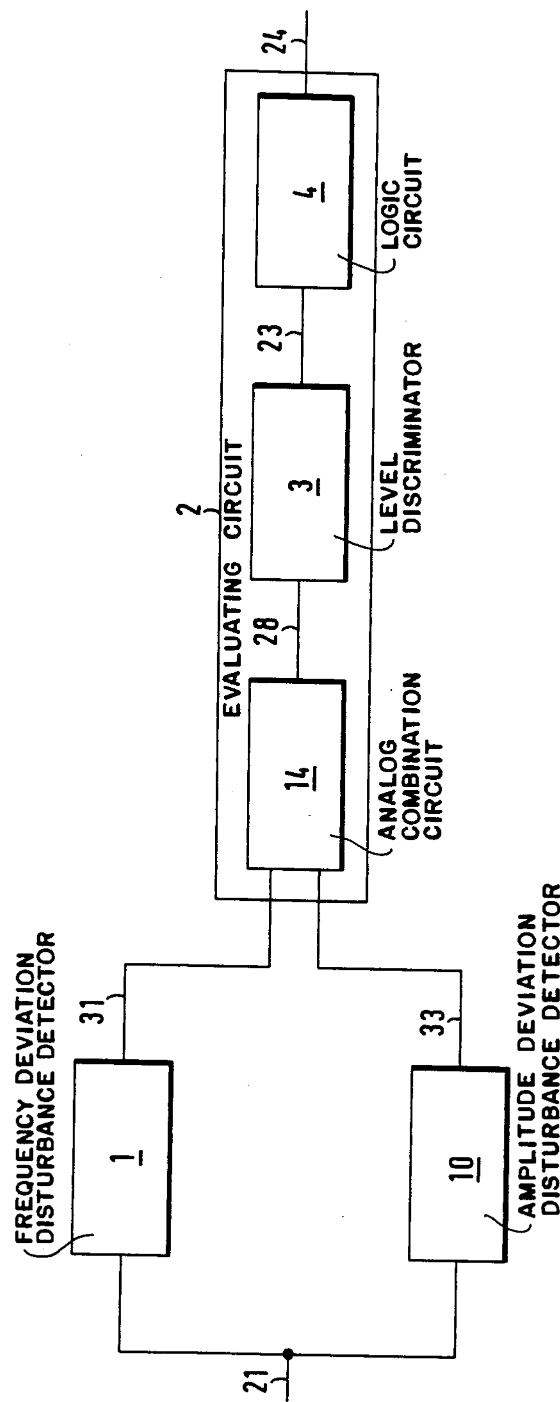
FIG. 9 is a view showing a block diagram of the detector with a circuit for analog combination of the output signal of the detector for indicating frequency disturbance deviation and the AM detector for indicating disturbance amplitude modulation.

In accordance with a simple embodiment of the invention shown in FIG. 9, only a single unipolar or bipolar level discriminator 3 is used. In this case it is necessary to provide at the input of the evaluating circuit 2 a circuit 14 for the analog combination of the output signal 31 and the output signal 33. An output voltage 28 of this circuit 14 increases with the input signals 31 and 33. When the output voltage 28 exceeds the threshold value provided in the level discriminator 3, the output signal 23 of the latter produces a binary indication that a reception disturbance has occurred. The subsequently connected logic circuit 4 can serve in this case for further logic processing of the signal 23. In a similar way, the remaining system components of the inventive detectors described before are identified with the circuit 14 for the analog connection combination of the output signals 31 and 33.

In accordance with an advantageous embodiment of the invention, the level threshold of the level discriminator or the level discriminators is dynamically adjusted in dependence on the time-averaged frequency deviation. This time-averaged frequency deviation can be derived in a known manner for example from the signal 22 at the output of the FM demodulator 8. For relatively adjusting the disturbance frequency deviation, it is advantageous in accordance with an especially advantageous embodiment of the invention to increase the threshold for determination of a disturbance frequency deviation with increasing effective frequency deviation. In this manner the sensitivity of the disturbance frequency deviation indication is increased in the event of small effective frequency deviations. Especially in the case of effective signals with great dynamics, it is advantageous to adjust the level threshold of the level discriminator in dependence on the occurring peaks of the effective frequency deviation. Here, the level threshold is increased correspondingly to increasing peaks of the effective frequency deviation. A detector in accordance with the present invention also indicates the noise as disturbance in the case of unfavorable signal/noise ratio in the high frequency channel. For better separation of the disturbance of this type from the multipath reception disturbances, the level threshold is adjusted additionally in dependence on the signal-noise ratio. It is then required, with the signal-noise ratio becomes smaller, to dynamically increase the level threshold for determination of a reception disturbance. In an advantageous manner, it is therefore prevented that in the reception areas with low reception field intensity, that is, with poor signal-noise ratio, such reception disturbances would be indicated which can be attributed merely to the absence of reception level. This adjustment is performed in accordance with the present invention so that with the presence of only pure noise a reception disturbance is nevertheless still indicated so that also in the case of a missing signal, a switching operation can be performed with the aid of this detection. With signal-noise ratio becoming smaller, only the sensitivity of the disturbance detection is thus decreased. Since the receiver noise frequently determines the total noise in the system, in an especially simple embodiment of the invention the adjustment of the level threshold can be carried out by the time-averaged amplitude of the high frequency carrier.

In accordance with a further embodiment of the invention, the level threshold of the level discriminator 7 or the level discriminators 3 and 11 can be respectively adjusted, exclusively or additionally, in dependence on the time averaged carrier amplitude. Advantageously, here the level threshold or level thresholds are increased with decreasing carrier amplitude. In accordance with a further embodiment of the invention, a circuit for detecting the peak value of the useful frequency deviation is provided and the threshold of the level discriminator 7 or the level discriminators 3 and 11 is respectively adjusted, exclusively or additionally, in dependence on these peak values of the useful frequency deviation. It is advantageous for the level threshold or the useful level thresholds to be increased with increasing peak values of the frequency deviation.

It will be understood that each of the elements described above, or two or more together, may also find a useful application in other types of apparatus differing from the types described above.

While the invention has been illustrated and described as embodied in a detector for indicating reception disturbances during ultrashort wave broadcast reception, it is not intended to be limited to the details shown since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A detector for indicating reception disturbances during ultrashort wave broadcast reception in a receiver having a frequency demodulator with a given passband and responsive to an IF signal in the receiver, particularly in power vehicles, comprising a detector for deriving a first output signal indicating disturbance-related frequency deviation in a high or intermediate frequency carrier; an amplitude modulation detector for deriving a second output signal indicating disturbance-related amplitude modulation in the high frequency or intermediate frequency carrier; and an evaluating circuit having first and second inputs that receive said first and second output signals of said detectors, respectively, said evaluating circuit including means responsive to said first and second output signals for deriving an output signal that depends both on the disturbance-related amplitude modulation and the disturbance-related frequency deviation as respectively indicated by said detectors.

2. A detector as defined in claim 1, wherein said evaluating circuit signal deriving means comprises a logic circuit arranged so that the output signal of said evaluating circuit has a binary character and that the occurrence of a reception disturbance is indicated only when both the disturbance-related frequency deviation and the disturbance-related amplitude modulation exceed respective suitably adjusted threshold values.

3. A detector as defined in claim 1, wherein said amplitude modulation detector for indicating the disturbance-related amplitude modulation is formed as an envelope curve demodulator.

4. A detector as defined in claim 3, wherein said amplitude modulation detector has a frequency bandwidth which is at least equal to a channel bandwidth of an ultrashort wave channel.

5. A detector as defined in claim 2, wherein said evaluating circuit signal deriving means also includes a level discriminator supplied with the output signal of said detector for indicating the disturbance-related frequency deviation, and a further, unipolar, level discriminator which is supplied with the output signal of said amplitude modulation detector, said level discriminators being arranged so that their output signals are supplied to said logic circuit of said evaluating circuit at whose output the presence of the reception disturbance is indicated by a binary signal.

6. A detector as defined in claim 5, wherein said first mentioned level discriminator is a unipolarly operating level discriminator.

7. A detector as defined in claim 5, wherein said first-mentioned level discriminator is a bipolarly operating level discriminator.

8. A detector as defined in claim 5, wherein said disturbance-related frequency deviation detector includes a wide-band FM demodulator connected in cascade with a circuit for increasing the steepness of pulse flanks, applied to said first-mentioned level discriminator.

9. A detector as defined in claim 5, wherein said amplitude modulation detector includes an amplitude modulation demodulator; and further comprising a circuit for increasing the steepness of pulse flanks arranged after said amplitude modulation demodulator and supplying the processed signal of said amplitude modulation detector to said second mentioned level discriminator.

10. A detector as defined in claim 5, and further comprising circuits for increasing the steepness of pulse flanks, arranged respectively prior to the input of said evaluating circuit receiving the output signals for indicating the disturbance-related amplitude modulation and at the input receiving the output signal for indicating the disturbance-related frequency deviation, and wherein output signals of said circuits for increasing the steepness of pulse flanks are supplied to said level discriminators, respectively.

11. A detector as defined in claim 10, wherein each of said circuits for increasing the steepness of pulse flanks includes a differentiating member composed of a series capacitance C and a parallel resistance R and a time constant RC adjusted so that for the output signal for indicating the disturbance-related frequency deviation it provides a reliable separation between the disturbance-related frequency deviation and longer-duration useful deviation pulses, and for the output signal for indicating the disturbance-related amplitude modulation it provides a reliable separation between local field intensity fluctuations and the disturbance-related amplitude modulation.

12. A detector as defined in claim 8, wherein said circuit for increasing the steepness of pulse flanks is composed of differentiating members connected with one another in a chain.

13. A detector as defined in claim 2, wherein said evaluating circuit signal deriving means includes two unipolarly operating level discriminators and the logic circuit, one of said level discriminators having only one level threshold which is adjusted for indicating the exceeding of a predetermined positive or negative frequency deviation, said level discriminators being arranged so that their output signals are supplied to said logic circuit and at an output of said logic circuit the presence of the reception disturbance is indicated by a binary signal.

14. A detector as defined in claim 13, wherein said evaluating circuit is provided at one input with a circuit having the character of a full wave rectifier and arranged after said detector for indicating the disturbance-related frequency deviation so that the processed output signal of said detector for indicating the disturbance-related frequency deviation is supplied to said circuit, said circuit having the character of a full wave rectifier being formed to convert input impulses with different polarities into output impulses with identical polarity and to supply the thus-processed signal to said one unipolar level discriminator with said subsequently arranged logic circuit.

15. A detector as defined in claim 8, wherein said circuit for increasing the steepness of pulse flanks is composed relative to the ratio between output and input signals thereof of an exponential function with an even-numbered exponent greater than 1.

16. A detector as defined in claim 8, wherein said circuit for increasing the steepness of pulse flanks is composed of a sum of exponential functions with identical signs, and with even exponents greater than the 1.

17. A detector as defined in claim 8, wherein said circuit for increasing the steepness of pulse flanks relative to the ratio between the output andinput signals thereof is composed of a function with the character of a hyperbolic cosine function.

18. A detector as defined in claim 2, wherein said logic circuit has the character of an AND-gate.

19. A detector as defined in claim 1, wherein said evaluating circuit includes a circuit for analog combination of the output signal of said detector for indicating the disturbance-related frequency deviation and the output signal of said amplitude modulation detector, and a level discriminator in cascade with a logic circuit so that at an output of said evaluating circuit the presence of the reception disturbance is indicated by a binary signal.

20. A detector as defined in claim 19, wherein said level discriminator has a level threshold which is adjusted for indicating exceeding of a predetermined frequency deviation and an output signal of said level discriminator is supplied to said logic circuit at whose output the presence of the reception disturbance is indicated by a binary signal.

21. A detector as defined in claim 19, wherein said level discriminator has level thresholds adjusted for indicating exceeding of a predetermined frequency disturbance deviation and an output signal of said level discriminator is supplied to said logic circuit at whose output the presence of the reception disturbance is indicated by a binary signal.

22. A detector as defined in claim 21, wherein said level discriminator is a bipolarly operating level discriminator.

23. A detector as defined in claim 20, wherein said level discriminator is a unipolarly operating level discriminator.

24. A detector as defined in claim 22, wherein said evaluating circuit has its input coupled to a circuit for increasing the steepness of pulse flanks and a processed signal is supplied y said circuit to said level discriminator.

25. A detector as defined in claim 24, wherein said circuit for increasing the steepness of pulse flanks is formed as a differentiating member including a series capacitance C and a parallel resistance R providing a time constant RC adjusted so as to provide a reliable separation of the shorter-duration disturbance pulses from the longer-duration useful deviation pulses.

26. A detector as defined in claim 24, wherein said circuit for increasing the steepness of the pulse flanks includes a plurality of differentiating members connected with one another in a chain.

27. A detector as defined in claim 19, wherein said level discriminator is a unipolarly operating level discriminator and has only one level threshold adjusted for indicating exceeding of a predetermined positive or negative frequency deviation and an output signal of said level discriminator is supplied to said logic circuit at whose output the presence of the reception disturbance is indicated by a binary signal.

28. A detector as defined in claim 19, wherein said evaluating circuit has its input coupled to a circuit of the character of a full-wave rectifier which converts input impulses with different polarity into output impulses with identical polarity and the thus-processed signal is supplied to said level discriminator.

29. A detector as defined in claim 24, wherein said circuit for increasing the steepness of pulse flanks relative to the ratio between output and input signals thereof is composed of an exponential function with an even-numbered exponent greater than 1.

30. A detector as defined in claim 24, wherein said circuit for increasing the steepness of pulse flanks is composed of a sum of exponential functions with identical signs and with even exponential greater than 1.

31. A detector as defined in claim 24, wherein said circuit for increasing the steepness of pulse flanks relative to the ratio between output and input signals thereof is composed of a function with the character of a hyberbolic cosine function.

32. A detector for indicating reception disturbances during ultrashort wave broadcast reception, particularly in power vehicles, comprising a detector for indicating disturbance-related frequency deviation in a high or intermediate frequency carrier; an amplitude modulation detector for indicating disturbance-related amplitude modulation in the high frequency or intermediate frequency carrier; an evaluating circuit having two inputs and arranged so that output signals of said detectors are supplied respectively to said inputs of said evaluating circuit and an output signal of said evaluating circuit depends on the disturbance-related amplitude modulation and the disturbance-related frequency deviation, said evaluating circuit including a logic circuit formed so that the output signal of said evaluating circuit has a binary character and that the occurrence of a reception disturbance is indicated only when both the disturbance-related frequency deviation and the disturbance-related amplitude modulation exceed respective suitably adjusted threshold values, a level discriminator supplied with the output signal of said detector for indicating the disturbance-related frequency deviation, and a further, unipolar, level discriminator which is supplied with the output signal of said amplitude modulation detector, said level discriminators being arranged so that their output signals are supplied to said logic circuit of said evaluating circuit at whose output the presence of the reception disturbance is indicated by a binary signal, at least one of said level discriminators having an adjustable level threshold; means for averaging the frequency deviation over time; and means for dynamically adjusting said level threshold in dependence on the time-averaged frequency deviation.

33. A detector as defined in claim 32, wherein each of said level discriminators has an adjustable level threshold; and wherein said adjusting means is operative for dynamically adjusting each of said level thresholds in dependence on the time-averaged frequency deviation.

34. A detector as defined in claim 32, wherein said adjusting means is operative for so adjusting said at least one level discriminator that the level threshold thereof increases with an increase of the time-averaged frequency deviation.

35. A detector as defined in claim 5; and further comprising a circuit for detecting the signal/noise ratio in a base-band signal, at least one of said level discriminators having an adjustable level threshold; and further comprising means for averaging the frequency deviation over time; and means for adjusting said level threshold in dependence on the signal/noise ratio.

36. A detector as defined in claim 35, wherein each of said level discriminators has an adjustable level threshold; and wherein said adjusting means is operative for adjusting each of said level thresholds in dependence on the signal/noise ratio.

37. A detector as defined in claim 35, wherein said adjusting means is operative for so adjusting said at least one level discriminator that the level threshold thereof is dynamically increased with an increase of the signal/-noise ratio.

38. A detector for indicating reception disturbances during ultrashort wave broadcast reception, particularly in power vehicles, comprising a detector for indicating disturbance-related frequency deviation in a high or intermediate frequency carrier; an amplitude modulation detector for indicating disturbance-related amplitude modulation in the high frequency or intermediate frequency carrier; an evaluating circuit having two inputs and arranged so that output signals of said detectors are supplied respectively to said inputs of said evaluating circuit and an output signal of said evaluating circuit depends on the disturbance-related amplitude modulation and the disturbance-related frequency deviation, said evaluating circuit including a logic circuit formed so that the output signal of said evaluating circuit has a binary character and that the occurrence of a reception disturbance is indicated only when both the disturbance-related frequency deviation and the disturbance-related amplitude modulation exceed respective suitably adjusted threshold values, a level discriminator supplied with the output signal of said detector for indicating the disturbance-related frequency deviation, and a further, unipolar, level discriminator which is supplied with the output signal of said amplitude modulation detector, said level discriminators being arranged so that their output signals are supplied to said logic circuit of said evaluating circuit at whose output the presence of the reception disturbance is indicated by a binary signal, at least one of said level discriminators having an adjustable level threshold; means for averaging the carrier amplitude over time; and means for adjusting said level threshold in dependence on the time-averaged carrier amplitude.

39. A detector as defined in claim 38, wherein each of said level discriminators has an adjustable level threshold; and wherein said adjusting means is operative for dynamically adjusting each of said level thresholds in dependence on the time-averaged carrier amplitude.

40. A detector as defined in claim 38, wherein said adjusting means is operative for so adjusting said at least one level discriminator that the level threshold thereof is adjusted exclusively in dependence on the time-averaged carrier amplitude.

41. A detector as defined in claim 38, wherein said adjusting means is operative for so adjusting said at least one level discriminator that the level threshold thereof is adjusted additionally in dependence on the time-averaged carrier amplitude.

42. A detector as defined in claim 38, wherein said adjusting means is operative for so adjusting said at least one level discriminator that the level threshold thereof is increased with decreasing carrier amplitude.

43. A detector as defined in claim 5, and further comprising a circuit for detecting the peak value of the useful frequency deviation, at least one of said level discriminators having an adjustable threshold; and further comprising means for averaging the frequency deviation over time; and means for adjusting said threshold in dependence on the peak values of the useful frequency deviation.

44. A detector as defined in claim 43, wherein each of said level discriminators has an adjustable threshold; and wherein said adjusting means is operative for adjusting each of said thresholds in dependence on the peak values of the useful frequency deviation.

45. A detector as defined in claim 43, wherein said adjusting means is operative for adjusting the threshold of said at least one level discriminator exclusively in dependence on the peak values of the useful frequency deviation.

46. A detector as defined in claim 43, wherein said adjusting means is operative for adjusting the threshold of said at least one level discriminator additionally in dependence on the peak values of the useful frequency deviation.

47. A detector as defined in claim 43, wherein said at least one level discriminator is formed so that with increasing peak values of the frequency effective deviation the level threshold is increased.

48. In an FM receive having a signal transmission channel with a given frequency bandwidth and an FM demodulator, a detector circuit for indicating reception disturbances in a received signal due to multipath signal reception comprising:

a first FM detector responsive to a carrier frequency signal in said receiver transmission channel for deriving a first output signal indicative of a disturbance-related frequency deviation in said carrier signal, a second AM detector responsive to said carrier frequency signal for deriving a second output signal indicative of a disturbance-related amplitude modulation in said carrier signal, and an evaluating circuit having input means that receive said first and second output signals and means responsive to said first and second output signals for deriving a further output signal dependent thereon to provide a rapid indication of a reception disturbance which indication appears substantially instantaneously with the occurrence of the reception disturbance.

49. A detector circuit as claimed in claim 48 wherein said evaluating circuit comprises a logic circuit for supplying said further output signal and level discriminator means responsive to at least one electrical parameter of the receiver for effectively adjusting the response level of the logic circuit dependent upon said electrical parameter.

50. A detector circuit as claimed in claim 49 wherein said level discriminator means is responsive to at least one of said first and second output signals.

51. A detector circuit as claimed in claim 50 further comprising pulse enhancement circuit means connected in cascade with at least one of said first and second detectors and said level discriminator means.

* * * * *